United States Patent [19]
Scholz

[11] Patent Number: 5,367,535
[45] Date of Patent: Nov. 22, 1994

[54] METHOD AND CIRCUIT FOR REGENERATING A BINARY BIT STREAM FROM A TERNARY SIGNAL

[75] Inventor: Werner Scholz, Gehrden, Germany

[73] Assignee: Deutsche Thomson-Brandt GmbH, Germany

[21] Appl. No.: 840,053

[22] Filed: Feb. 21, 1992

[51] Int. Cl.$^5$ .......................................... H04L 25/34
[52] U.S. Cl. ...................................... 375/17; 375/76; 341/57
[58] Field of Search ............... 375/17, 18, 76; 360/40; 341/56, 57; 371/30

[56] References Cited

U.S. PATENT DOCUMENTS

| | | | |
|---|---|---|---|
| 4,081,756 | 3/1978 | Price et al. | 375/104 |
| 4,413,347 | 11/1983 | Kobayashi | 341/57 |
| 4,504,872 | 3/1985 | Petersen | 360/40 |
| 4,626,933 | 12/1980 | Buoska et al. | 360/51 |
| 4,661,801 | 4/1987 | Chen et al. | 341/57 |

*Primary Examiner*—Stephen Chin
*Assistant Examiner*—T. Ghebretinsae
*Attorney, Agent, or Firm*—Joseph S. Tripoli; Eric P. Herrman; Ronald H. Kurdyla

[57] ABSTRACT

A circuit for developing a binary bitstream signal from a ternary analog signal having positive and negative amplitude peaks includes an analog-to-digital converter for receiving the analog signal and providing digital samples in accordance with the amplitude and polarity of the analog signal. The most significant bit of digital sample indicates the polarity of an analog signal sample. A threshold value is compared to a current amplitude sample to indicate a level change in the analog signal when the sample value exceeds the threshold value and the polarity differs from that of the preceding sample which exceeded the threshold value. The current sample value which exceeds the threshold value is compared with preceding sample values which exceeded the threshold value, and a level change is indicated by the sample value which most exceeds the threshold value. Incorrect sample values are inverted in a correction circuit.

10 Claims, 6 Drawing Sheets

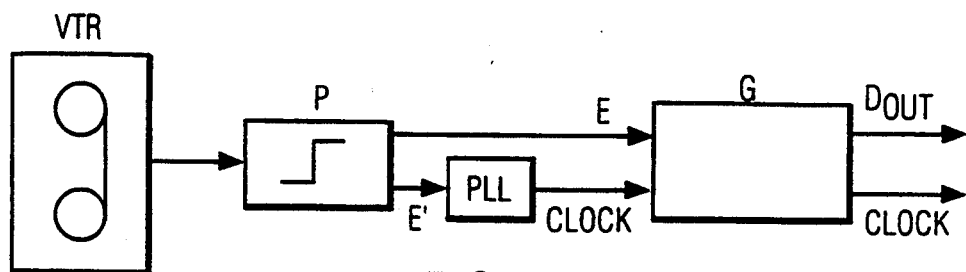
FIG. 1
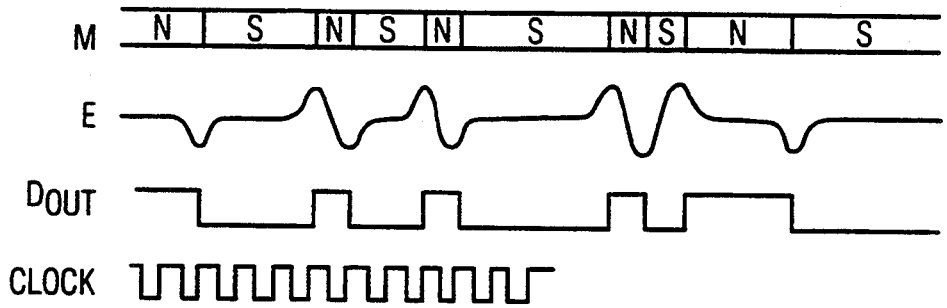
FIG. 2
| E | MSB | A | | | |
|---|---|---|---|---|---|
| 8 | 0 | 1 | 0 | 0 | 0 |
| 7 | 0 | 0 | 1 | 1 | 1 |
| 6 | 0 | 0 | 1 | 1 | 0 |
| 5 | 0 | 0 | 1 | 0 | 1 |
| 4 | 0 | 0 | 1 | 0 | 0 |
| 3 | 0 | 0 | 0 | 1 | 1 |
| 2 | 0 | 0 | 0 | 1 | 0 |
| 1 | 0 | 0 | 0 | 0 | 1 |
| 0 | 0 | 0 | 0 | 0 | 0 |
| -0 | 1 | 0 | 0 | 0 | 0 |
| -1 | 1 | 0 | 0 | 0 | 1 |
| -2 | 1 | 0 | 0 | 1 | 0 |
| -3 | 1 | 0 | 0 | 1 | 1 |
| -4 | 1 | 0 | 1 | 0 | 0 |
| -5 | 1 | 0 | 1 | 0 | 1 |
| -6 | 1 | 0 | 1 | 1 | 0 |
| -7 | 1 | 0 | 1 | 1 | 1 |
| -8 | 1 | 1 | 0 | 0 | 0 |
FIG. 2a

METHOD AND CIRCUIT FOR REGENERATING A BINARY BIT STREAM FROM A TERNARY SIGNAL

BACKGROUND OF THE INVENTION

1. Field of the Invention

This invention is directed to a method and circuit for regenerating a binary signal from a ternary signal. Such a method of generating a binary signal is known as the "Viterbi Detection" method and is described in "IEEE Transactions on Communications", vol. Com-34, No. 5, May 1986, pp. 454 through 461. The Viterbi regeneration method results in a reduction in the error rate or, an improvement in the signal-to-noise ratio in the order of 1–3 db, compared to circuits having a pure threshold value detector.

SUMMARY OF THE INVENTION

The inventive method of regenerating a binary signal provides an increased signal-to-noise ratio as compared to a threshold value detector and has the advantages of the Viterbi technique but uses simpler circuitry than existing techniques.

Apparatus according to the principles of the present invention includes a comparator network responsive to a reference threshold value, to digital samples of an input bitstream and to a signal indicating a bitstream level transition. The comparator network provides dual comparisons. The comparator network compares a current amplitude sample to the threshold value, and also compares a current amplitude sample which exceeds the threshold with a preceding sample which exceeds the threshold value to determine a maximum sample value which is reached before the threshold value is exceeded by a sample with a different polarity. The comparator network indicates the occurrence of a level transition when the threshold is exceeded by a sample exhibiting a different polarity relative to a preceding sample which exceeded the threshold. The comparator network also indicates the occurrence of a level transition associated with a sample which exceeds the threshold by the greatest amount when the threshold is exceeded several times in succession by samples of the same polarity.

BRIEF DESCRIPTION OF THE DRAWINGS

FIG. 1 is a block diagram of an arrangement for reading data from a tape.

FIG. 2 illustrates the magnetic signals which are present on the tape and the bit regeneration signals.

FIG. 2a shows a code table for analog to digital conversion in the apparatus of FIG. 3.

FIG. 2a shows the code table for the digital-to-analog converter A/D used in the FIG. 3 embodiment.

DESCRIPTION OF THE PREFERRED EMBODIMENTS

FIG. 1 shows a circuit for retrieving the bit stream recorded on a magnetic medium, and FIG. 2 shows the signal M recorded on the tape and signals used in the circuit. The magnetic track M contains the bit pattern in binary form, i.e. in the form of oppositely magnetized areas, as indicated by the symbols N (north pole) and S (south pole). In the playback head, a playback voltage is induced by the flux changes between the areas N and S or S and N. This voltage roughly represents the differentiated bit pattern. The pulses generated by the magnetization transitions are narrowed, or freed from the influences of neighboring bits, in an equalizing circuit P. The original bit stream can be obtained from the equalized signal E in circuit section G in various ways, for example, by integration, zero crossing detection and scanning using a bit timing (clock) regenerated with a PLL circuit. The advantage of this method is that by integrating the ternary signal E, a signal is generated the evaluation of which, when using a zero crossing detector, is essentially independent of the level. Insofar as the binary signal contains very low frequency spectrum components and large runlength values, it is more favorable to evaluate the ternary signal E directly using a level determiner. A Schmitt trigger can, for example, serve as the level determiner which alternately registers the positive and negative pulses. However, in order to maintain the optimum trigger points, an automatic amplification regulation is required for the ternary signal E. The binary output signal from the Schmitt trigger is scanned using the regenerated bit clock to determine the final position of the level transitions. An improvement in the interference immunity can be achieved upon signal evaluation using the aforementioned Viterbi detection of the ternary signal E. With this known circuit the signal is preferably processed in two circuit branches. Herefor, the signal is scanned alternately by two analog-to-digital converters. In addition to the analog-to-digital converter, each branch contains various registers, comparators, adders and a RAM with an addressing facility.

The inventive circuit for regenerating a bit stream from a ternary signal has increased interference immunity compared to a simple level determiner and requires considerably less circuitry. In addition to an analog-to-digital converter, only some registers and two comparators are required.

Figure 3:
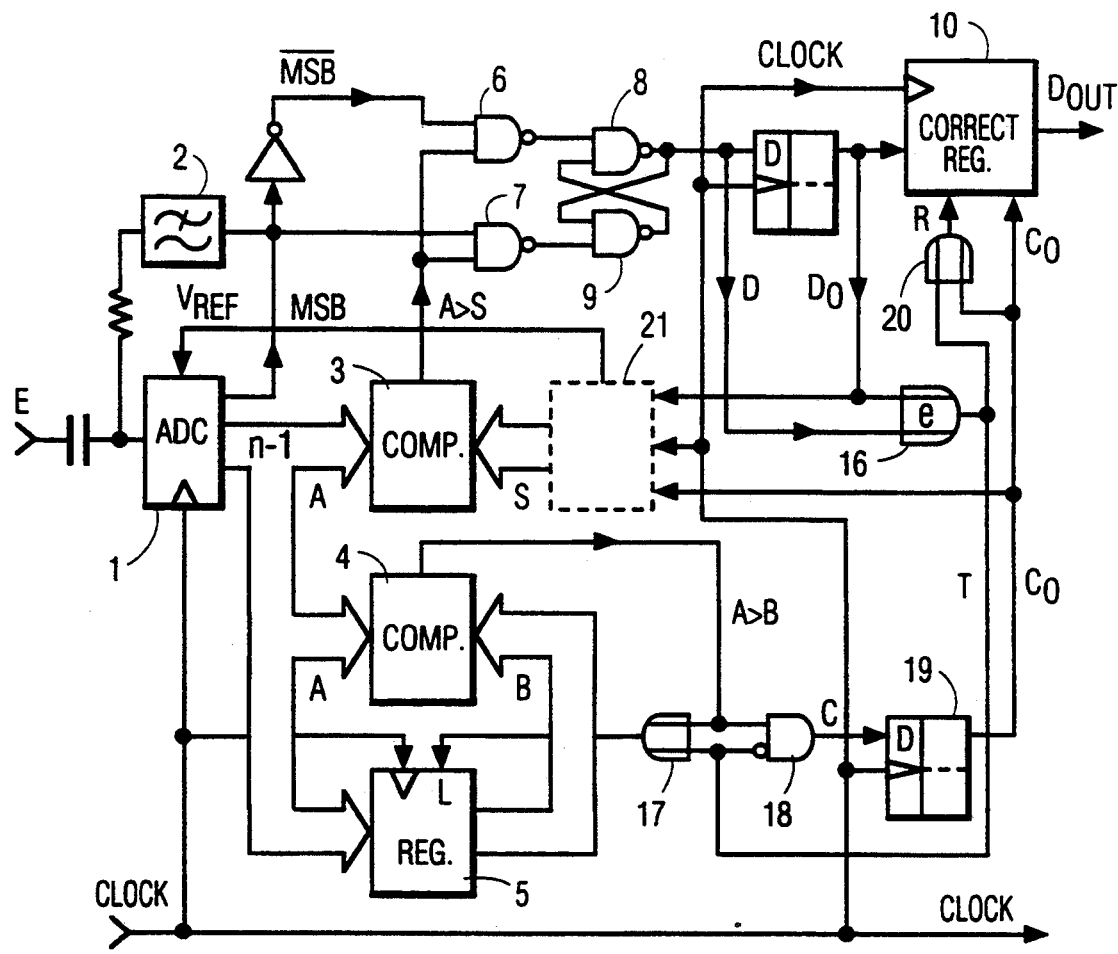
FIG. 3 is a block diagram of a preferred embodiment.
Figure 5:
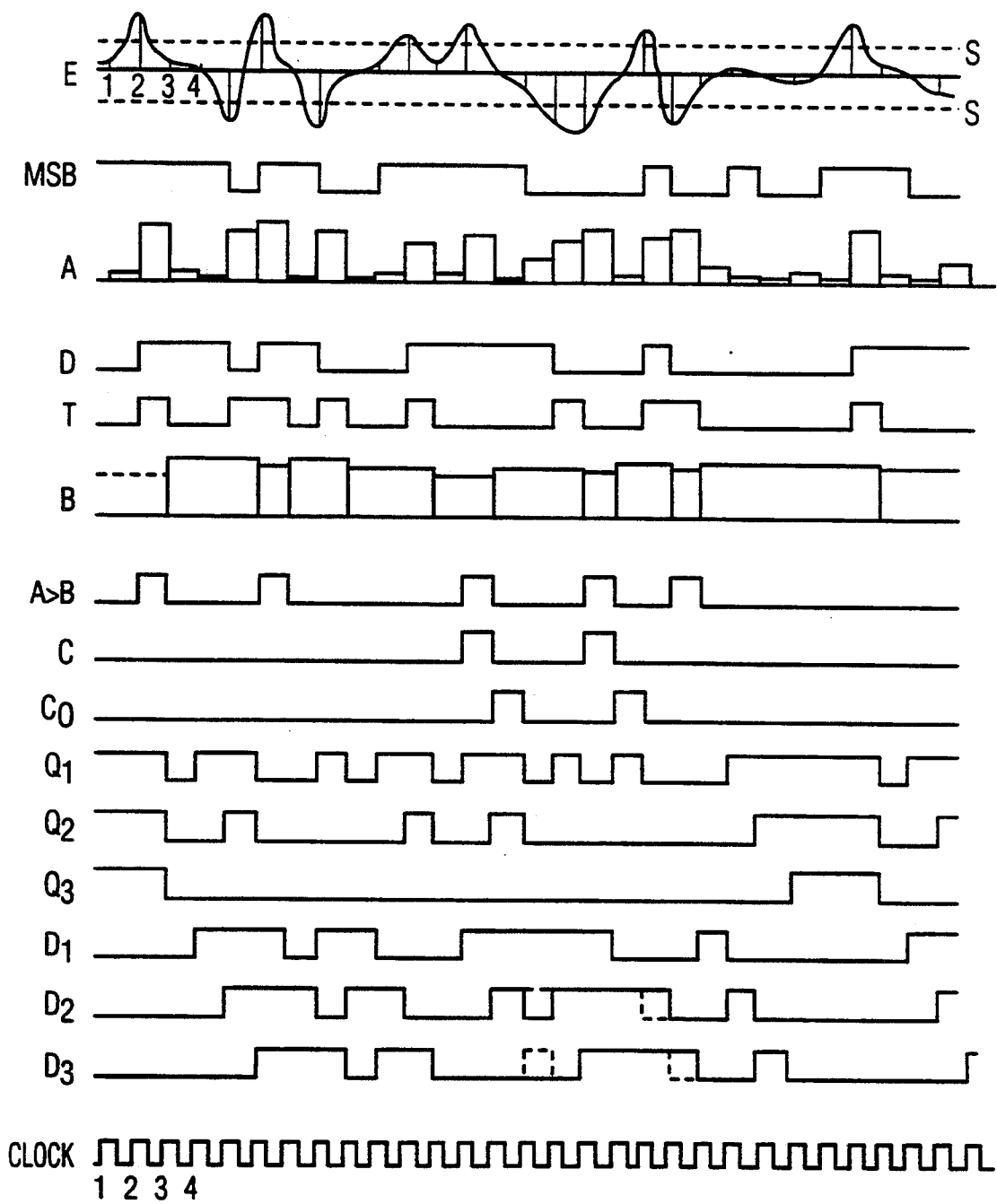
FIG. 5 illustrates the operational signals of the circuits of FIGS. 3 and 4.

FIG. 3 is a block diagram of such a bit stream generator, and FIG. 5 shows the operational signals. An equalized ternary signal E is scanned by the analog-to-digital converter 1 with the help of the regenerated bit clock. The scanning times are roughly set by the phase-shift control of the clock regeneration circuit (PLL) to the peaks of the signal E.

FIG. 2a shows the digital output of the analog-to-digital converter 1 for the various signal values 0 to 8. The most significant bit (MSB) represents the algebraic sign and the remaining n-1 bits specify the absolute values A of the scanning values. It is practical to utilize the MSB for the bias voltage regulation at the input of the analog-to-digital converter. In the prior art a voltage is generated from the average value of the MSBs and is amplified and fed back to the input of the analog-to-digital converter via a low pass filter. With the invention the setting is arranged so that the "0" and "1" appear as MSBs with roughly equal frequency.

In FIG. 3, comparators 3 and 4 examine only the absolute value A (Table 1) of the scanning values. The comparator 3 establishes whether the scanning value A exceeds a predetermined threshold level S. The comparator 4 determines the maximum scanning value B which is reached prior to the threshold value S being reached with an opposite algebraic sign. The maximum absolute value B reached is stored in a register 5. Each time the threshold value S is exceeded, the gates 6 and 7 supply a negative pulse to one of the input terminals of the RS flip-flop formed by the gates 8 and 9, the algebraic sign of the MSB determines which gate 6 or 7 is actuated. The output signal D from flip-flop 8, 9 corresponds to the signal regenerated with a simple threshold value detector. The value transitions of signal D occur when the threshold value is exceeded and the algebraic sign of the MSB changes. Thus, in the interference-free signal E, successive scanning values in excess of the threshold value and with different algebraic signs, belong to a value transition of the original bit stream. For successive exceedings of the threshold value S having the same algebraic sign, the highest scanning value will, with high probability, correspond to the actual value of the transition. The remaining values that exceed the threshold value are considered as interference. The circuit shown in FIG. 3 determines the probably correct transition values in the presence of signal faults. The correction register 10 enables correction of the bit stream D.

Figure 4:
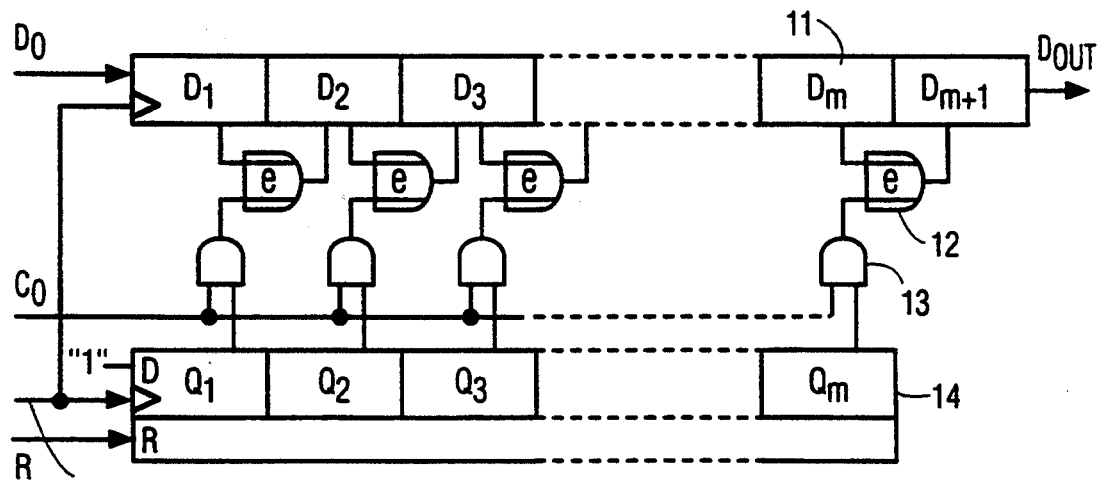
FIG. 4 is a preferred embodiment of the correction circuit of FIG. 3.

The bit stream D is read into the correction register 10 via a D type flip-flop 15. One arrangement for the correction register 10 is shown in FIG. 4. The length of the two shift registers 11 and 14 corresponds to the maximum runlength of the signal because displacements in the value transition which may be necessary do not exceed the distance between the actual value transitions. The movement of the bits in the shift register 11, which always contains the final m bits of the scanned bit stream, is carried out by a plurality of EXOR gate 12, which make the inverting of a section of the bit stream possible, if it is required. The register 14 is reset, in a clock synchronous way, at every value transition which is the highest of several of the same algebraic sign, and set step-by-step, with the bit clock, between the values transitions. The inverting of the bits in the shift register 11 can be triggered according to the steps set in the shift register 14 by the AND gates 13.

Every level transition of the signal D generates a one-bit long, positive pulse T at the output of the EXOR gate 16. The OR gate 17 operates so that the register 5 is loaded with the current scanning value upon detection of a scanning value increase without a change in sign, and also for each value transition of the signal D. The gate 18 operates so that for each scanning value increase which is not associated with a value transition, the series of bits is inverted in the correction circuit (shift register) 10. The signal C, which effects the inverting, is delayed by one bit for the temporal matching by means of the D-flipflop 19. The gate 20 resets the register 14 in the correction circuit 10 at every value transition T, or at every value transition displacement which is used for signal correction.

There is a possibility that the threshold S can be automatically matched to the signal value and the signal quality. An increase in the frequency of occurrence of the pulses Co indicates that the threshold S is set too low. A threshold S which is set too high results in some value transitions not being registered. Thereby; an alternation to the runlength statistic of the signal ensues in favor of the higher runlength values, or, respectively, the maximum runlength of signals with restricted runlength is exceeded. This information can be utilized for the automatic optimization of the threshold value S with the help of a logic circuit 21. The reference voltage V Ref of the analog-to-digital converter can also be adjusted via this logic circuit. Therewith, an automatic gain stabilization for the input signal E can be omitted, if applicable.

With the inventive circuit, bit errors occur when a fault causes a value A which is greater than the value of the neighboring value transition, or when the threshold value is exceeded as a result of a fault, and has an opposite algebraic sign. An optimization of the threshold value renders this event relatively improbable. Consequently, the circuit causes an improvement in the interference immunity compared to a simple threshold level detector.

In FIG. 3, the circuit section consisting of the analog-to-digital converter 1, the two comparator 3 and 4, and the register 5, can also be built as an analog circuit. The analog-to-digital converter and the register 5 are then replaced by scanning and holding circuits and the two comparators replaced by analog comparators with binary outputs. An additional comparator can be used to determine the algebraic sign of the scanning levels, while the ternary signal E is sent via a full-wave rectifier for forming the value. The rest of the circuit can remain unchanged.

In the FIGS. 3 through 5, a circuit was described which effects an improvement in the interference immunity with the bit stream regeneration. In the above-mentioned IEEE publication, an improvement in the interference immunity is achieved using a Viterbi detector and uses a partial response class IV signal (PR4).

With the signal E used in the FIG. 3 circuit the high frequencies are most strongly raised. However, with a PR4 signal it is primarily the middle frequencies which are raised, resulting in especially good interference immunity. The generation of the PR4 signal is shown schematically in FIGS. 6 and 7. The signal E in FIG. 3 corresponds to a signal which has been created from the bit stream Din through the transmission function $1-D$, where D is the signal delay of 1 bit. Multiplication using the transmission function $1+D$ results in the PR4 signal (see FIGS. 6 and 7). It can be seen that the PR4 signal has a smaller bandwidth than the signal E.

Figure 6:
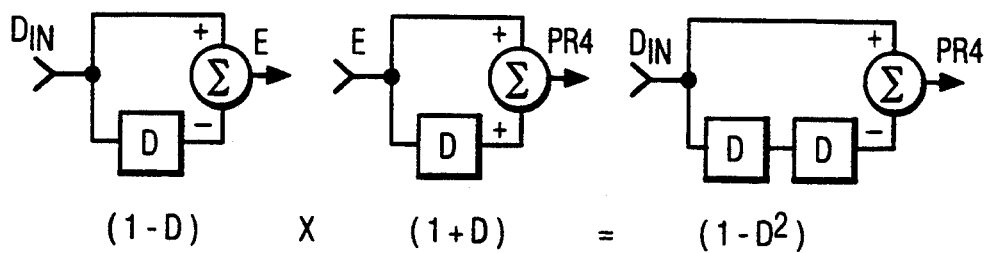
FIGS. 6, 7, and 8 show how a PR4 signal is generated.

The PR4 signal can also be generated directly using the circuit with the transmission function $1-D^2$, shown on the right in FIG. 6. The PR4 signal is a ternary signal with the level values 1, 0, $-1$. A binary signal P can be obtained from this signal through the formation of values. The signal P corresponds to a signal which was generated from the signal Din using the circuit shown on the right of FIG. 8. In this circuit, the input signal Din is combined in an EXOR gate with the signal delayed by two bit cycles. This signal modification can be cancelled through a precoding by means of the circuit specified on the left of FIG. 8 (Dout in FIG. 7).

Figure 7:
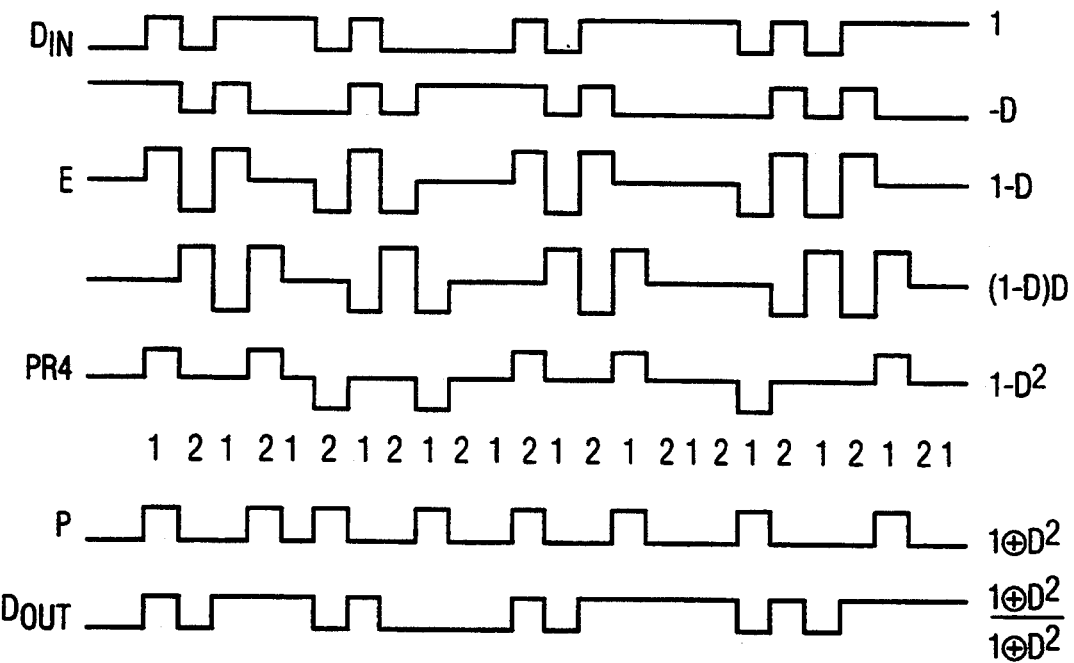

In the FIG. 3 circuit the signal E, which is used for error correction, has alternating positive and negative pulses. As is shown in FIG. 7, that is no longer true for a PR4 signal. FIG. 7 also illustrates that the PR4 signal consists of two pulse sequences which correspond to the above-mentioned alternate polarity rule and are combined in a time-division multiplex. In FIG. 7, the sequence of pulses designated "1" and the sequence of pulses designated "2" have alternate negative and positive pulses. Accordingly, there is the possibility of processing a PR4 signal by means of a correction circuit according to FIG. 3. For this, the PR4 signal is demultiplexed before or after the analog-to-digital converter and processed in two parallel branches according to FIGS. 3 through 5 like the Viterbi detection. Afterwards, the signal is reassembled using a multiplexer.

Figure 9:
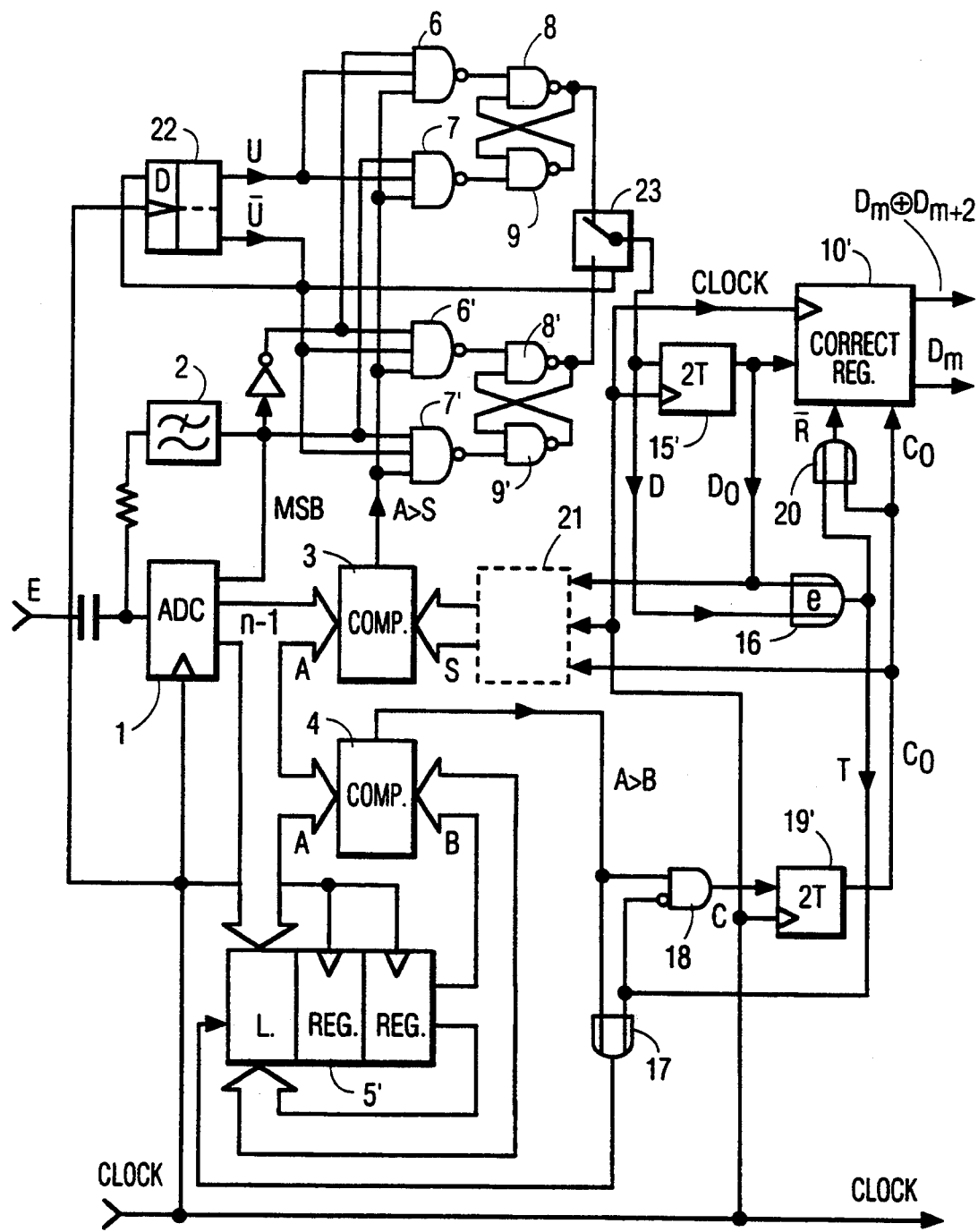
FIG. 9 is a preferred embodiment using a PR4 signal.
Figure 10:
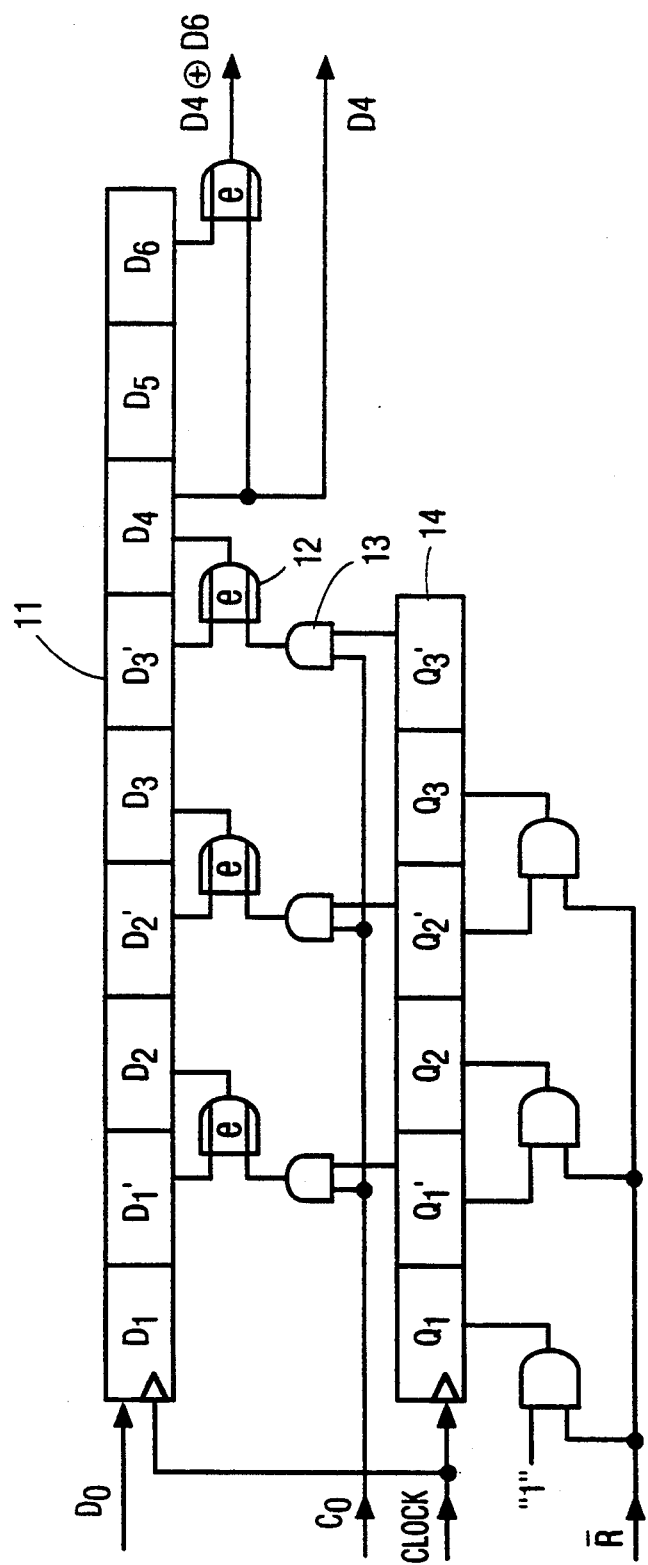
FIG. 10 is a preferred embodiment of the correction circuit used in the FIG. 9 embodiment.

By using the circuit shown in FIGS. 9 and 10, the PR4 signal can also be processed directly in the time-division multiplex. The additional required circuitry includes another of the RS flipflops 6 through 9. The delay in register 5 and in the Din flipflops 15 and 19 is two bit cycles each, i.e. for each signal path there are two D type flip-flops connected in series and operated at the bit rate clock. The flip-flop 22 generates the change-over voltage U which ensures that the RS flipflops 8, 9 and 8', 9' are alternately activated and that the output voltage of the RS flipflops 8, 9 and 8', 9' are alternately fed via a change-over switch 23 to the further processing circuitry. The correction register 10' is less complex than the FIG. 4 embodiment because only every other stage of the shift register 11 is coupled to the following stage via an EXOR gate 12. Also, in the register 14 only every other stage is synchronously reset.

The correction register 10' shown in FIG. 10 includes three correction stages. Therefore, it can correct signal half-waves up to a runlength of 4 double bits, i.e. 8 bits. The signal example in FIG. 7 shows that increases in runlength can occur in the partial signal formed from even-numbered or, respectively, odd-numbered scanning values of the PR4 signal. However, it is not absolutely necessary to correspondingly increase the length of the correction register. As the majority of the level transition displacements which are to be corrected only have a few bits, a good corrective effect can be achieved using a relatively short correction register.

The interpulse period in the two partial signals 1 and 2 of the PR4 signal (FIG. 7) determines the duration of an error propagation as a result of a faulty decision. In every case, an error propagation ends with the next correctly recognized level transition.

The circuit shown in FIGS. 9 and 10 triggers a regeneration of the bit pattern Din which is, for example, the bit pattern on a recording medium. If this bit pattern was generated by a precoding, for example, according to FIG. 8 left, then the original bit pattern must be regenerated through an additional code conversion (according to FIG. 8 right). As FIG. 10 shows, this code conversion circuit can be combined with the correction register.

Figure 8:
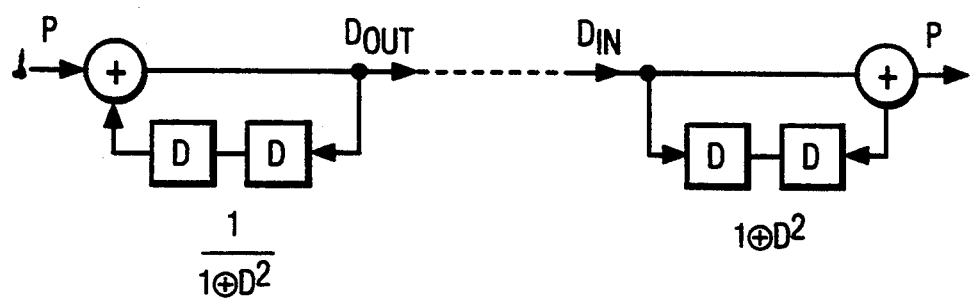

The code conversion according to FIG. 8 right generates merely one double bit error from a faulty bit, thereby causing practically no error propagation. The circuit according to FIGS. 9 and 10 is, therefore, suitable for both signals with precoding and signals without precoding. Compared with that, the known detector circuits for the PR4 signals generate the signal P from the signal Din. In order to obtain the signal Din, the code conversion circuit shown on the left of FIG. 8 would have to be connected downstream from the detector circuit. However, this circuit already causes unlimited error propagation with just one single bit error. It is, therefore, customary to integrate this code conversion as a precoding prior to the signal transmission. The known signal transmission facilities with PR4 detection require this precoding. Compared with this, the PR4 detection method according to FIGS. 9 and 10 is independent of the precoding.

I claim:

1. Apparatus for processing a binary bitstream derived from an analog ternary signal having positive and negative polarity amplitude excursions with respect to an intermediate reference level, said apparatus comprising:

an analog-to-digital converter for converting said analog signal into a bit coded binary digital signal comprising a sampled data bitstream, said converter operating at a bit rate and providing output binary digital data samples of said analog signal, each sample containing designated bits representing the polarity of an analog signal sample and representing the amplitude of said analog signal sample;

a sensing circuit responsive to a signal from said analog-to-digital converter for providing an output signal indicating bitstream level transitions;

a bitstream processing circuit;

a source providing a reference threshold value;

a comparator network for providing output signals in response to said threshold value, to said transition indicating signal, and to digital samples from said converter for (a) in a first comparison, comparing a current amplitude representative sample to said threshold value and (b) in a second comparison, comparing a current amplitude representative sample exceeding said threshold with a preceding sample exceeding said threshold to determine a maximum sample value which is reached before said threshold is exceeded by a different polarity sample associated with a level transition; and means for coupling said comparator network output signals to said bitstream processing circuit.

2. Apparatus according to claim 1, wherein said apparatus indicates (1) a level transition when said threshold is exceeded by a sample exhibiting a different polarity relative to a preceding sample which exceeded said threshold, and (2) a level transition associated with a sample which exceeds said threshold by the greatest amount when said threshold is exceeded several times in succession by samples of similar polarity.

3. Apparatus according to claim 1, wherein
a most significant bit (MSB) of said designated bits represents said polarity, and remaining bits represent amplitude.

4. Apparatus according to claim 1, wherein
positive and negative polarity samples occur with substantially the same frequency of occurrence.

5. Apparatus according to claim 1, wherein said comparator network comprises
a first comparator circuit responsive to said digital samples and to said threshold value for performing said first comparison;

a storage device responsive to said digital samples and to said transition indicating signal for storing a current sample value in response to (a) the appearance of a sample with an increased value without a level transition, and in response to (b) the appearance of a level transition; and a second comparator circuit responsive to said digital samples and to an output signal from said storage device for comparing a current sample value with a value stored in said storage device.

6. Apparatus according to claim 5 wherein said bitstream processing circuit is responsive to a provisional bitstream signal from said first comparator for providing a corrected output bitstream as a function of said transition indicating signal and an output signal from said second comparator.

7. Apparatus according to claim 5 and further including a detector circuit responsive to an output bitstream signal from said first comparator for generating said transition indicating signal in response to the appearance of level transitions in said bitstream signal from said first comparator.

8. Apparatus according to claim 6, wherein said bitstream processing circuit comprises a shift register.

9. Apparatus according to claim 8, wherein said register exhibits a length approximating a maximum runlength of bitstream data components; and said register is clocked at said bit rate.

10. Apparatus according to claim 6, wherein said bitstream processing circuit comprises a first shift register clocked at said bit rate and responsive to said provisional bitstream signal from said first comparator, to a control signal derived from said transition indicating signal, and to an output signal from said second comparator; and a parallel second shift register clocked at said bit rate and having storage elements corresponding to storage elements of said first shift register; wherein said second register is reset in response to a signal representing a sample value exceeding said threshold concurrent with a level transition; and said second register is reset, and bits stored by said first register are inverted, in response to a signal representing an increased sample value without a concurrent level transition.

* * * * *